US006609305B2

(12) United States Patent
Lysen

(10) Patent No.: US 6,609,305 B2
(45) Date of Patent: Aug. 26, 2003

(54) PROCESS AND DEVICE FOR DETERMINING THE AXIAL POSITION OF TWO MACHINE SPINDLES

(75) Inventor: Heinrich Lysen, Garching (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 10/085,624

(22) Filed: Mar. 1, 2002

(65) Prior Publication Data

US 2002/0129504 A1 Sep. 19, 2002

(30) Foreign Application Priority Data

Mar. 1, 2001 (DE) .......................................... 101 09 462

(51) Int. Cl.[7] .............................................. G01B 11/26
(52) U.S. Cl. .............................. 33/206; 33/412; 33/661
(58) Field of Search .......................... 33/286, 412, 613, 33/626, 642, 645, 655, 661

(56) References Cited

U.S. PATENT DOCUMENTS

| 4,102,052 A | * | 7/1978 | Bloch | 33/412 |
| 4,566,202 A | * | 1/1986 | Hamar | 33/286 |
| 4,591,293 A | * | 5/1986 | Levallois et al. | 33/645 |
| 4,709,485 A | * | 12/1987 | Bowman | 33/286 |
| 4,928,401 A | * | 5/1990 | Murray, Jr. | 33/645 |
| 5,077,905 A | * | 1/1992 | Murray, Jr. | 33/412 |
| 5,224,052 A | | 6/1993 | Hamar | |
| 5,435,073 A | * | 7/1995 | Sullivan | 33/661 |
| 6,427,348 B1 | * | 8/2002 | Webb | 33/286 |

* cited by examiner

Primary Examiner—G. Bradley Bennett
(74) Attorney, Agent, or Firm—Nixon Peabody LLP; David S. Safran

(57) ABSTRACT

A process and device are provided for determining the axial position of two spindles or shafts, for example on machine tools, with respect to parallel offset and angular offset. The process includes moving both an optical transmitting device and also an optical receiving device each into at least three different rotary positions. In this way, pertinent circles can be defined by which the location of the axis of rotation of the first spindle or the center of rotation of the second spindle can be computed in relation to one another. The parallel offset of the spindles can thus be determined in the horizontal and in the vertical plane. To determine the angular offset of the two spindles, another measurement of this type must be taken in which the optical transmitting device and the receiving device are mounted interchanged with one another on the spindles.

11 Claims, 6 Drawing Sheets

PROCESS AND DEVICE FOR DETERMINING THE AXIAL POSITION OF TWO MACHINE SPINDLES

BACKGROUND OF THE INVENTION

1. Field of the Invention

The invention relates to a process and a device for determining the axial position of two machine spindles.

2. Description of Related Art

One such process, as disclosed in U.S. Pat. No. 5,224,052 to Hamar, includes a laser alignment system having a laser emission element as the optical transmitting device and a photosensitive target as the optical receiving means. With the target, the location of an incident laser beam can be determined. Instead of a tool, the target can be mounted in the shaft of a machine tool, or in a reference part positioned opposite the tool. The laser emission element and the target can be interchangeably mounted on either the reference part or the rotating tool.

In the Hamar patent, it is assumed that both the laser emission element and the photosensitive target are of essentially absolute accuracy, i.e. the smallest measured value which can be displayed by the instrument is relatively great compared to its systematic inherent error. However, this assumption does not always prevail, since although the corresponding measurement devices are to operate with a resolution and accuracy in the micron range, the devices can become inaccurate due to rough treatment and/or strong temperature effects.

SUMMARY OF THE INVENTION

It is therefore one object of the present invention to overcome the deficiencies of the prior art and to provide a process which works with high precision together with the pertinent device of the generic type.

Another object of the present invention is to provide a process/device which can not only check itself, but compared to the prior art, can deliver much greater precise measurement results.

Yet another object of the present invention is to provide a process/device which is easy to handle.

Still another object of the present invention is to provide a process/device which is no more expensive than conventional solutions.

The above object, and other objects, are achieved by providing a process for determining the axial position of two machine spindles or shafts relative to one another. The process includes the steps of emitting a light beam from an optical transmitting device mounted on the end face of a first machine spindle wherein the light beam is emitted roughly in an axial direction of the first spindle; providing a flat optical receiving device on an end face of a second machine spindle positioned frontally opposite the first machine spindle to receive the light beam and to determine the light beam's incidence point in two coordinates; and determining a distance between the transmitting device and the receiving device. The process further includes the steps of moving the first machine spindle into at least three freely selectable, but defined first rotary positions while the second machine spindle is stationary and recording a position of each incidence point of each light spot corresponding to each first rotary position to generate at least three positions. The at least three positions of the incidence point are used to compute the parameters of a pertinent first circle, especially its center point on the optical receiving device or alternatively to specify it in the best possible manner by means of an error compensation method. The process also includes the steps of moving the second machine spindle into at least three, freely selectable, but defined second rotary positions while the first machine spindle is stationary, and recording a position of each incidence point of each light spot corresponding to each second rotary position to generate at least three positions. The at least three positions of the incidence point are used to compute the parameters of a pertinent second circle, especially its center point on the optical receiving device, or alternatively to specify it in the best possible manner by means of an error compensation method. The process also includes the step of computing a parallel offset of the first and second spindles in at least one of a horizontal and a vertical plane from the at least one parameter of the first circle, the at least one parameter of the second circle and the distance between the optical transmitting device and the optical receiving device.

In another embodiment of the invention, the determination of the angular offset (orientation) of two machine spindles or shafts relative to one another is enabled by the implementation of the following process steps: first, the process is carried out as indicated above. Then, the transmitting device and the receiving device are mounted interchanged on the machine spindles or shafts to be studied, so that the optical transmitting device is mounted on the second machine spindle and the optical receiving device is mounted on the first machine spindle. Afterwards the process is repeated analogously as indicated above so that, however, now parameters for the other two, specifically a third and a fourth circle, can be computed. With this data, and considering the distance between the optical transmitting device and the optical receiving device, now the values for the angular offset in the horizontal and vertical direction can also be determined. The computed values for parallel offset and angular offset can be used not only to undertake manual correction of the alignment of spindles, but can also be supplied to an adjustment means which moves at least one of the two spindles to be aligned horizontally and vertically until accurate enough alignment is achieved, whereupon the corresponding spindle can be locked in the conventional manner by means of clamp screws or other fastening devices.

According to the process of the present invention, there is the advantage that a closed circular ring on the target need not be imaged by the laser beam. Rather, it is enough to determine the data of the measurement points on an arc. In especially favorably supported cases, it can be enough to determine the measured values of only three incidence points of the laser beam at a time and to subject the parameters of the circles specified in this way on the receiving device to another computational process. It is especially useful here for the parameters of the pertinent circle to be determined in a direct, noniterative computational process when there are a plurality of acquired measurement points. Here methods of compensation computation are used, especially methods of least squares. In addition to the indicated parameters (x and y position of the center and radius of the circle), therefore, it is also possible to provide details regarding the quality of the compensation results. Thus, important statistical parameters such as relative error, correlation coefficient, skewness of the distribution, etc. can also be given.

The proposed process works essentially without the use of measured inclinometer values. In one version of the invention however there are one or more preferably electronic inclinometers which indicate the actual rotary position of the spindle, and with measurement results which are also used in determining the unknown circles. Thus, determination of the parallel offset and angular offset of the spindle is possible with greater accuracy.

In addition, it is advantageous if all the completed measurements and all pertinent measurement results, optionally also tentative results, are immediately displayed on an electronic screen so that the operator can acquire a subjective impression of the quality of the measurement process.

DETAILED DESCRIPTION OF THE INVENTION

Figure 1:
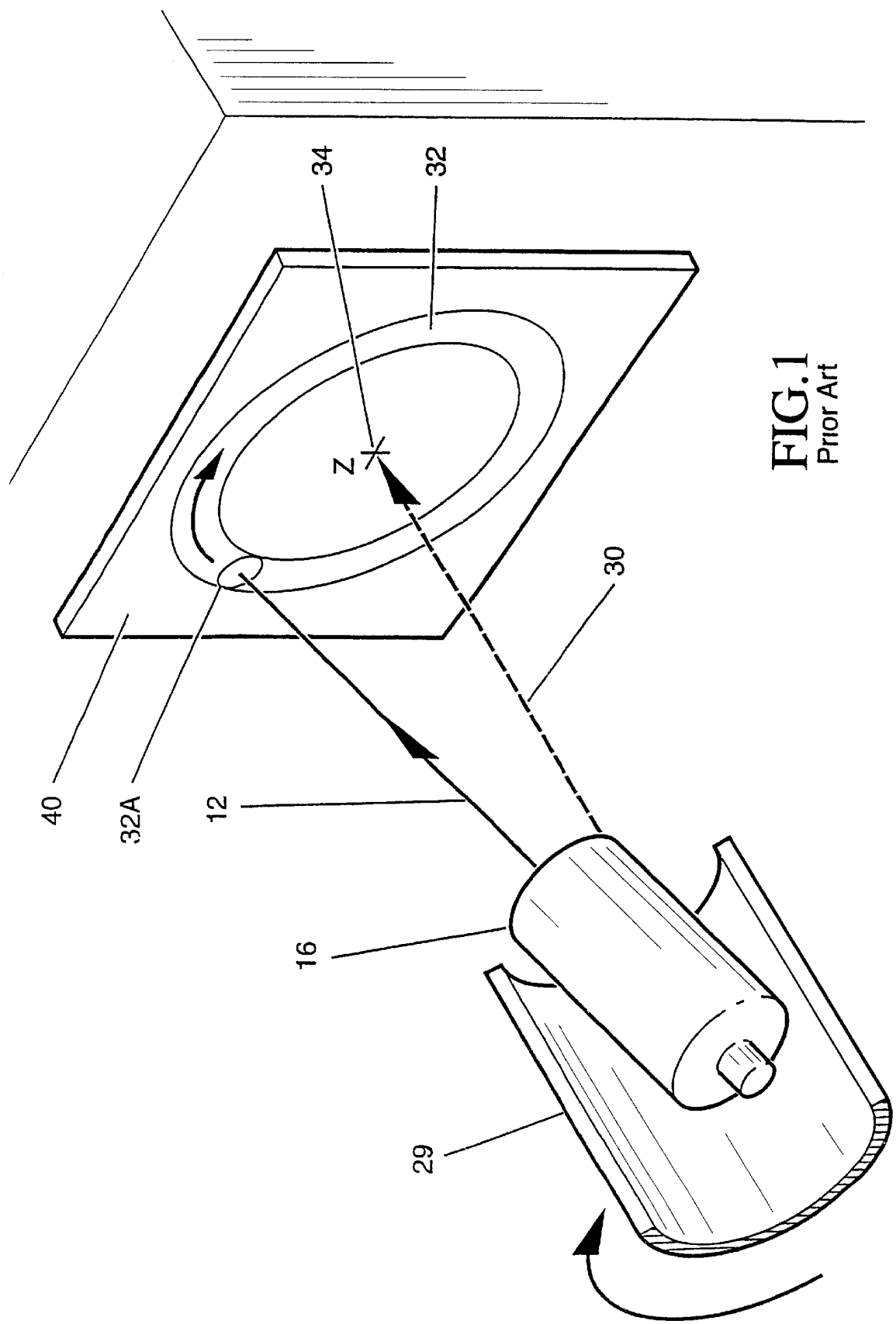
FIG. 1 shows a conventional device for specification of the penetration point of the axis of rotation through the target.

FIG. 1 shows a conventional arrangement similar to that disclosed in U.S. Pat. No. 5,224,052. An optical transmitting means in the form of a laser beam generator 16 is mounted on the spindle 29, e.g. shaft end or the like, by, for example, a jaw chuck (not shown). In practice, the position of the laser beam 12 deviates relative to the spindle axis 30 (shown exaggerated in the drawings). When the spindle 29 turns, the family of curves of the beams 12 describes roughly a conical jacket so that a circular ring 32 is described on the target 40, caused by the individual light spots 32A. The circular ring is centered around the pertinent center Z, indicated at 34, which thus defines the penetration point of the axis of rotation 30 through the target 40.

Figure 2:
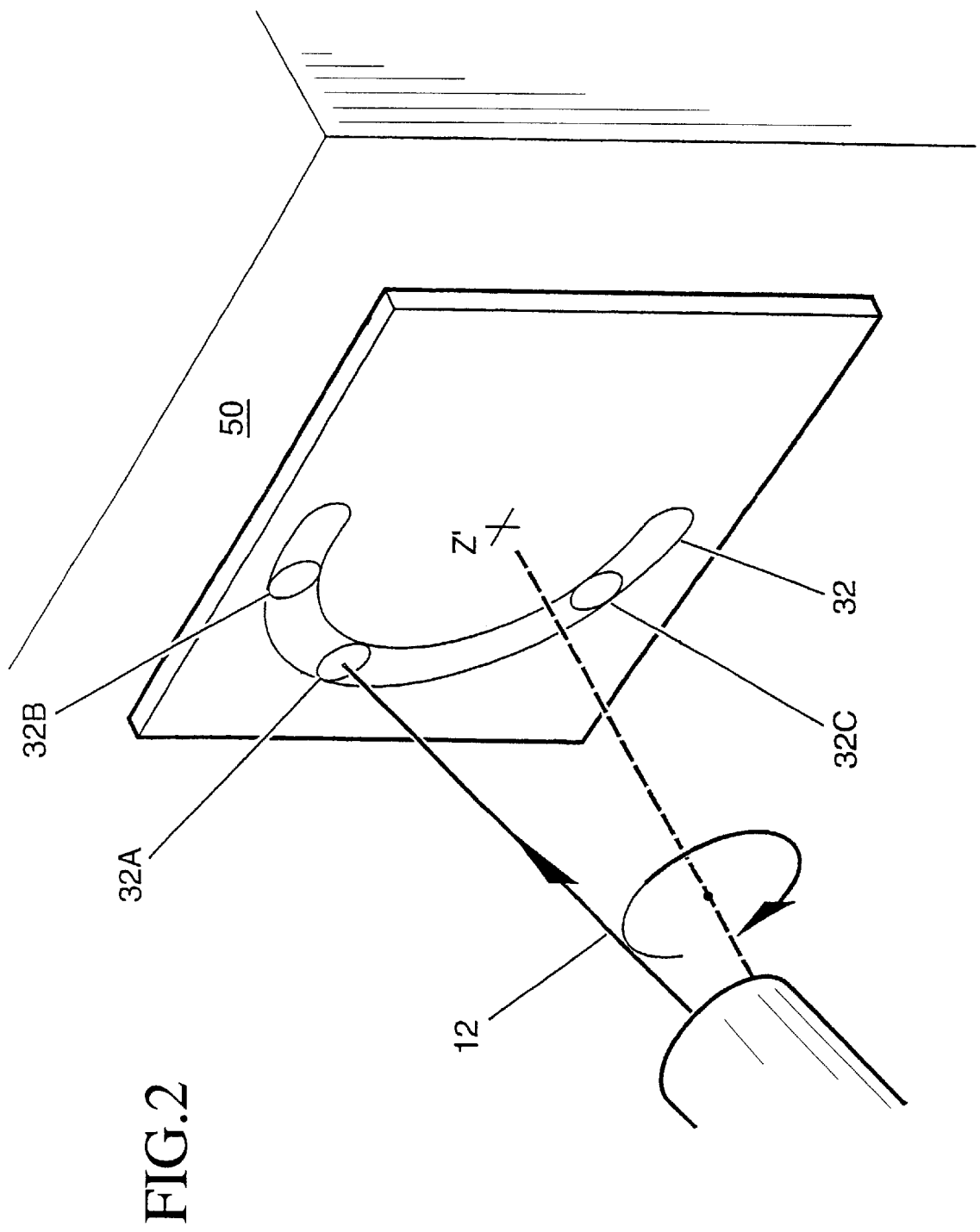
FIG. 2 shows the arrangement of the present invention for determining the penetration point if the incidence points of the laser beam lie only on part of the full circle (arc)

FIG. 2 shows how, using the process of the present invention, the penetration point Z' can be determined using only an arc, or individual light spots 32A, 32B and 32C, instead of a circular ring. The pertinent center Z' can be determined with comparatively great precision by means of a best adjustment and using the method of least squares also from those light spots, if their two-dimensional coordinates have been electronically established. This is done in practice for most contours in a direct, non-iterative computational process. If necessary, however, iterative computational methods can be used. Importantly, FIG. 2 shows the conditions which arise for a rotating first spindle and a stationary second spindle.

Figure 3:
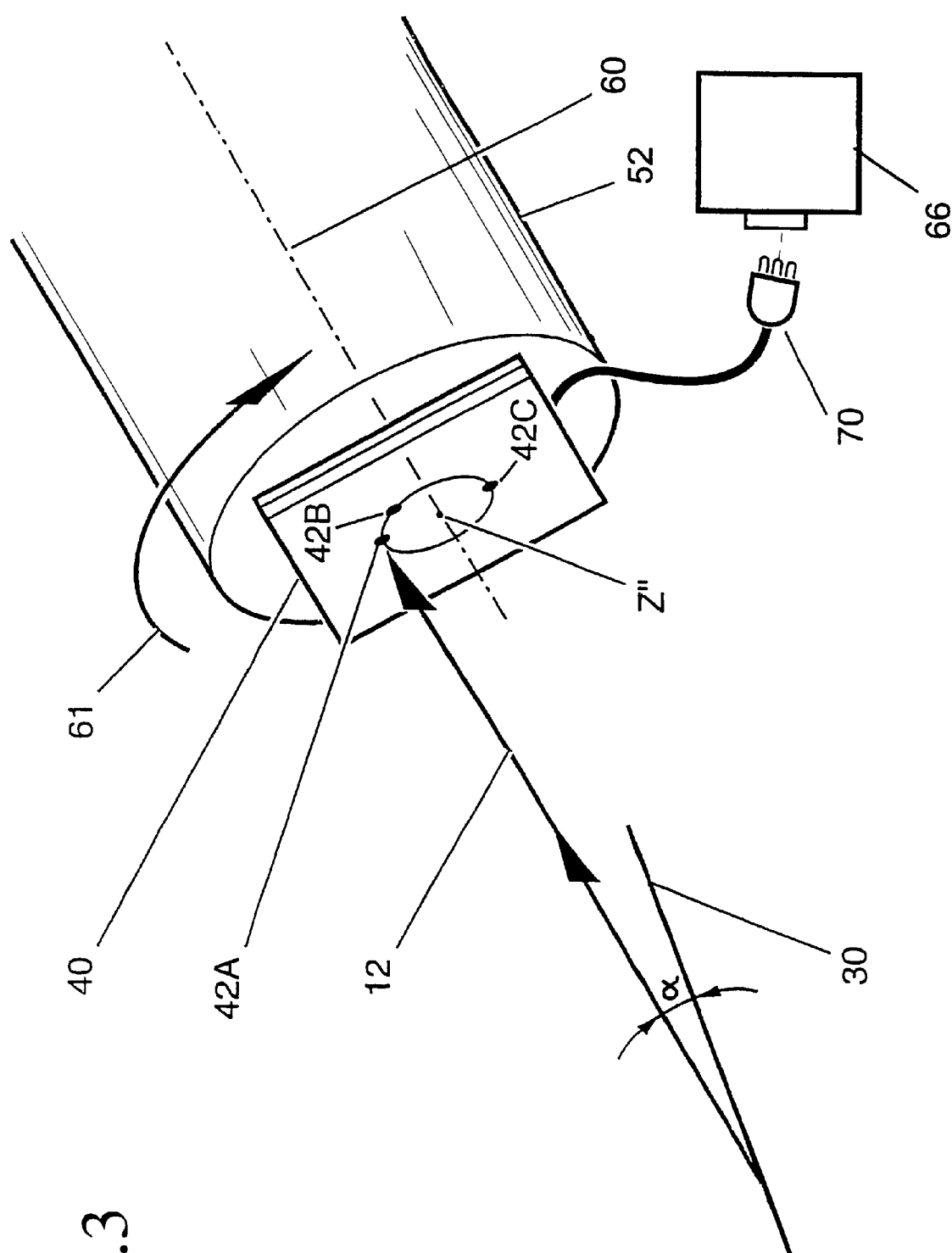
FIG. 3 shows the determination of the position of the axis of rotation of a spindle or shaft according to the present invention relative to the target used.

FIG. 3 shows an arrangement of the present invention wherein an individual light beam 12 is emitted with the first spindle locked relative to its axis 30 of rotation to define a first incidence point 42A on the target 40. The position of an axis 60 of rotation of a second spindle 52 relative to the target 40 can be very accurately determined and checked by turning the second spindle 52 a few times by any angle of rotation (cf. rotary arrow 61) so that, for example, additional light spots 42B, 42C appear due to the light beam 12. The light spots define a circle having a center point Z" lying on the actual axis 60 of rotation. In this case, the precision can also be increased in the determination of Z". In turn, however, more than only three measurement points and, moreover, a pertinent mathematical error compensation process, can be used. A processing device, such as appropriate electronics or a computer 66, may be connected downstream of the optical receiving device 40 via a plug device 70 to permit measurement results, which are present in electrical form, to be further processed and displayed.

Figure 4:
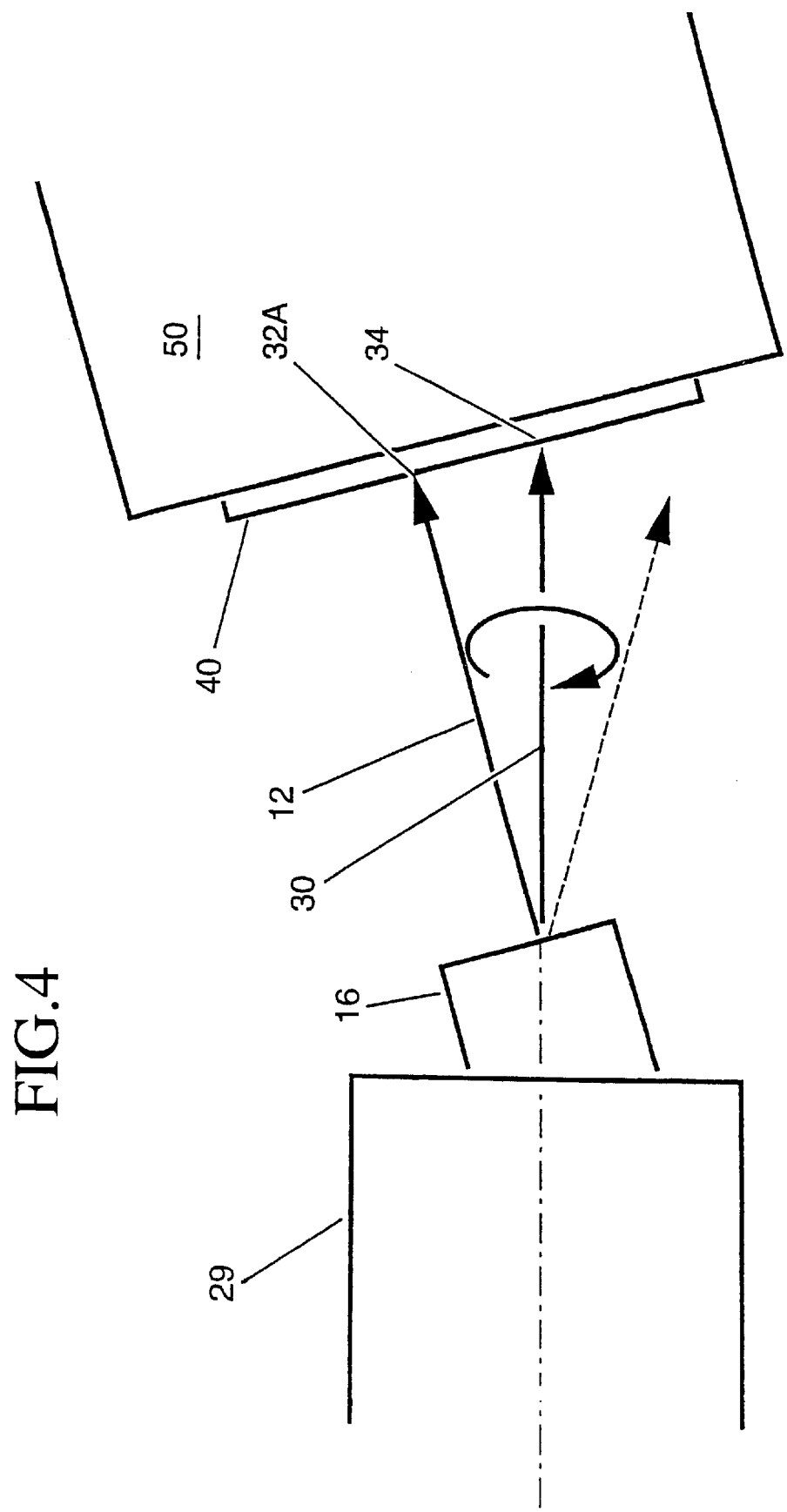
FIG. 4 shows how the true axis of rotation of the spindle is determined compared to the family of curves of the emitted laser beams.

In FIG. 4, showing a cross-sectional view of the conditions of the present invention from FIG. 2, it is apparent that receiving device 40 (sensor) can be situated such that the penetration point 34 can lie somewhat near the sensor edge without the measurement errors experienced for a long time in conventional arrangements.

Figure 5:
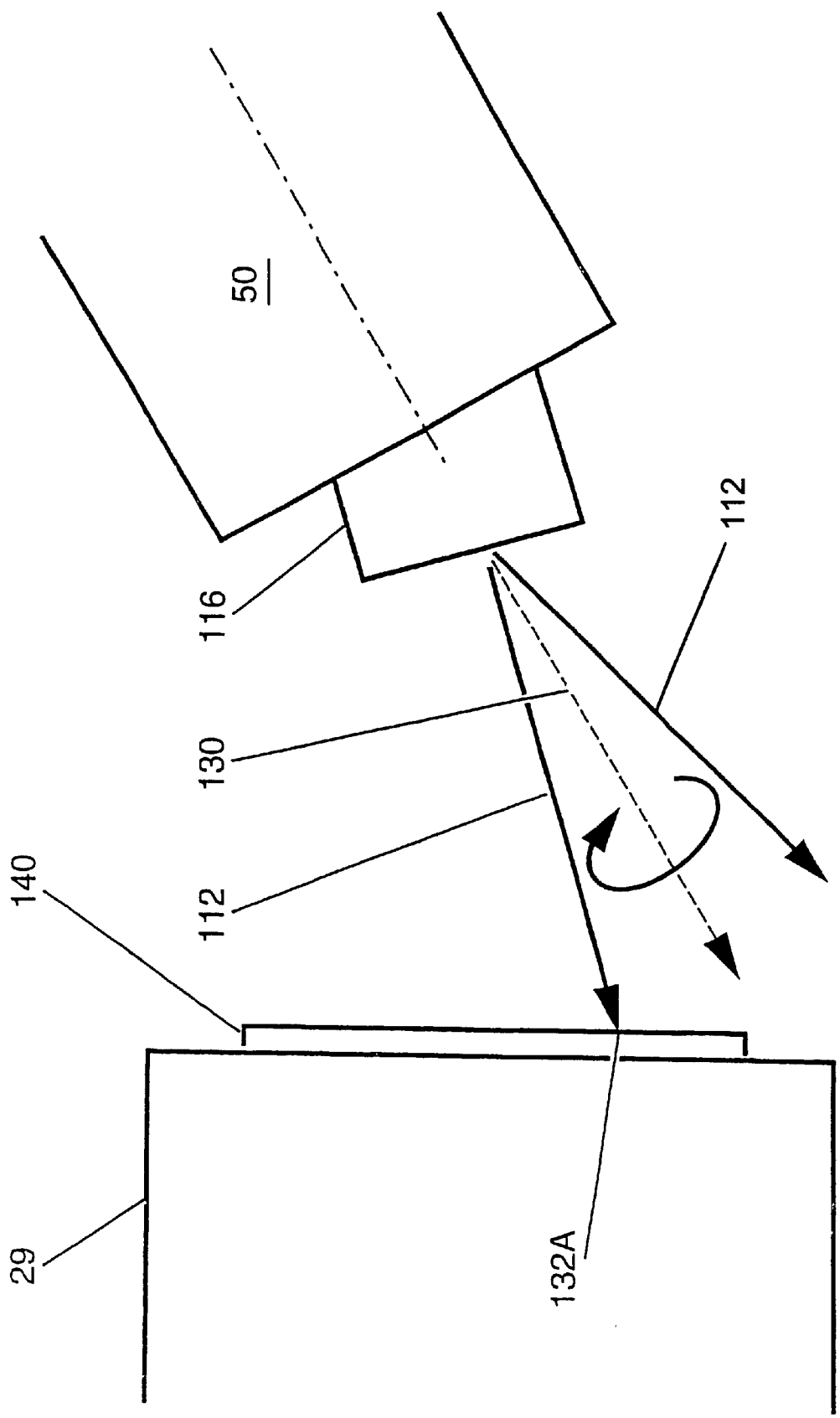
FIG. 5 shows another embodiment of the present invention, but with the optical transmitting and receiving means mounted interchanged.

Similarly, FIG. 5 shows the conditions of the present invention from FIG. 3 with the transmitting and receiving devices, 116 and 140, respectively, being interchanged on the first and second spindles, 29 and 50, respectively. When the second spindle 50 turns, there is a cone of light beams 112 around the actual axis 130 of rotation, as shown. The incidence point 132A is thus relatively near the border or edge of the receiving device 140, but with additional incidence points can nevertheless also be used to determine the pertinent circle center.

Figure 6:
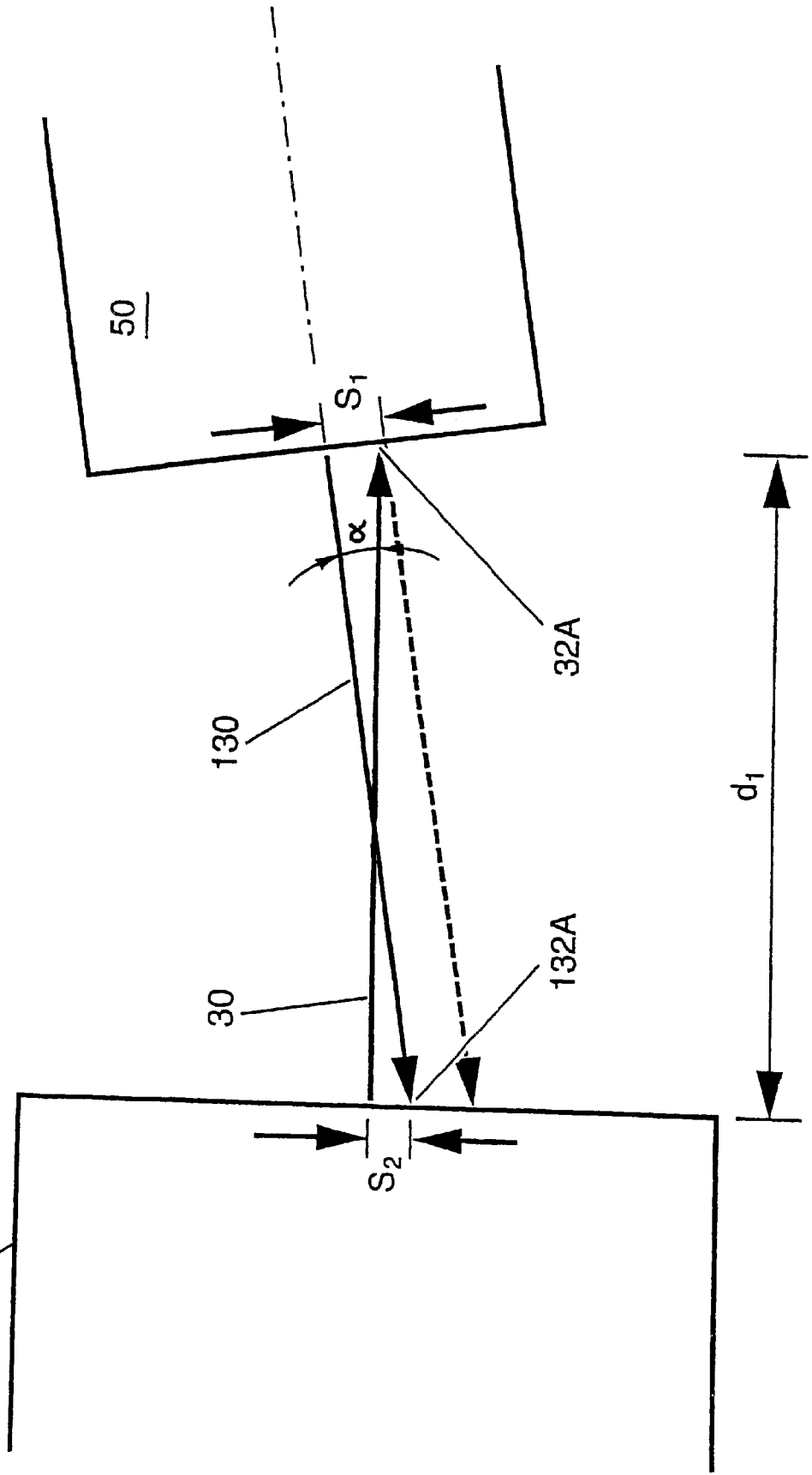
FIG. 6 shows the schematic for determining the angular offset of the involved spindles.

If measurements as shown in FIGS. 4 and 5 have been taken with the transmitting/receiving devices interchanged, the orientation of the spindles relative to one another is determined as shown in FIG. 6. Assuming small angle sizes, the angular offset, shown by way of example in the vertical direction, results from the amounts of offset S1 and S2 measured in the y direction, so that tan (alpha)=roughly (S1+S2)/d1. A corresponding analysis applies to the angular offset in the horizontal, therefore azimuth direction. The spindles may be moved manually or by motor.

I claim:

1. A process for determining the axial position of two machine spindles relative to one another, comprising the steps of:

emitting a light beam from an optical transmitting device mounted on the end face of a first machine spindle, the light beam being emitted roughly in an axial direction of the first spindle;

providing a flat optical receiving device on an end face of a second machine spindle positioned frontally opposite the first machine spindle to receive the light beam and to determine the light beam's incidence point in two coordinates;

determining a distance between the transmitting device and the receiving device;

moving the first machine spindle into at least three freely selectable, but defined first rotary positions while the second machine spindle is stationary;

recording a position of each incidence point of each light spot corresponding to each first rotary position to generate at least three positions;

using the at least three positions of the incidence points of the light spots to at least one of compute at least one parameter of a first circle and determine at least one parameter of a first circle using an error compensation method;

moving the second machine spindle into at least three, freely selectable, but defined second rotary positions while the first machine spindle is stationary;

recording a position of each incidence point of each light spot corresponding to each second rotary position to generate at least three positions;

using the at least three positions of the incidence points of the light spots to at least one of compute at least one parameter of a second circle and determine at least one parameter of a second circle using an error compensation method;

computing a parallel offset of the first and second spindles in at least one of a horizontal and a vertical plane from the at least one parameter of the first circle, the at least one parameter of the second circle and the distance between the optical transmitting device and the optical receiving device.

2. The process of claim 1, wherein the at least one parameter of the first and second circles is a center point of the respective circle on the optical receiving device.

3. The process of claim 1, further including the steps of:

interchanging the mounting of the transmitting device and the receiving device on the machine spindles so that the optical transmitting device is located on the second machine spindle and the optical receiving device is located on the first machine spindle;

after interchanging the mounting of the transmitting device and the receiving device, repeating the emitting step of claim 1 and repeating the moving, recording and using steps of claim 1 twice to compute the parameters of a third circle and a fourth circle;

computing an angular offset and a parallel offset of the first and second spindles in at least one of a horizontal and a vertical plane from the distance between the transmitting device and the receiving device and from the at least one parameter of each of the first, second, third and fourth circles.

4. The process of claim 3, further including the step of moving at least one of the two spindles relative to the other spindle based on the computed amounts of offset relating to at least one of the parallel offset and the angular offset such that an offset is minimized or eliminated.

5. The process of claim 1, wherein the parameters of the circles are determined in a direct, noniterative computational process.

6. The process of claim 1, wherein, in addition to the at least one parameter of the circles, pertinent statistical parameters of a computed best curve adaptation are given.

7. The process of claim 3, further including the steps of acquiring an additional rotary position of at least one of the first and the second spindle using inclinometers and using measured inclinometer values of the additional rotary position in the computing step for determining the at least one of the parallel offset and the angular offset in at least one of the horizontal and vertical directions.

8. The process of claim 1, wherein the observed incidence points of the light beams, the computed circles and the computed amounts of offset are displayed on an electronic screen.

9. A device for determining an axial position and orientation of a first spindle and a second machine positioned opposite the first spindle relative to one another, comprising:

an optical transmitting device mounted on an end face of the first spindle to emit a light beam in the axial direction of the first spindle;

a flat optical receiving device mounted on an end face of the second spindle to receive the light beam to permit determining the light beam's incidence point in two coordinates;

a processing device connected to the optical receiving device to compute at least one parameter of a circle using at least three recorded incidence points for determining the axial position and orientation of the spindles relative to one another.

10. The device of claim 9, wherein the at least one parameter of the circle includes center point coordinates and a radius.

11. The device of claim 9, further including one or more inclinometers to determine the respective rotary position of a spindle, the inclinometer values being supplied, in addition to the values of the incidence points of the light beam, to the processing device to improve measurement accuracy.

* * * * *